United States Patent Office 2,779,741
Patented Jan. 29, 1957

2,779,741

WATER-SOLUBLE COMPOSITIONS CONTAINING WATER-INSOLUBLE ORGANIC AMINES

James M. Cross, Belvidere, N. J., assignor to General Aniline & Film Corporation, a corporation of Delaware No Drawing. Application December 26, 1950, Serial No. 202,800

7 Claims. (Cl. 252—357)

This invention relates to water-insoluble amine compositions yielding clear aqueous solutions at high concentrations, which can be diluted indefinitely with water without precipitation of their compounds.

More particularly, the invention relates to compositions containing a water-insoluble hydrocarbon monoamine in which the hydrocarbon radical comprises an aliphatic or cycloaliphatic hydrocarbon group of at least 10 carbon atoms and preferably 10 to 20 carbon atoms, or a difficulty water-soluble salt of said amine, and a water-soluble surface-active quaternary ammonium salt, said composition yielding clear aqueous solutions at a concentration of about 50%, and which remain clear at all concentrations resulting upon further dilution with water.

Higher aliphatic and cycloaliphatic hydrocarbon monoamines, especially those in which the hydrocarbon group contains at least 10 carbon atoms, and alkyl- or cycloalkyl-aromatic hydrocarbon monoamines containing a higher aliphatic or cycloaliphatic radical of at least 10 carbon atoms are insoluble or practically insoluble in water. Their salts with inorganic acids such as hydrochloric, sulfuric, nitric and phosphoric acids, generally have very low solubility in water. Their organic acid salts such as the formates and acetates sometimes yield clear solutions at higher concentrations, but precipitate upon dilution to a critical concentration range with separation of the amine salt or the corresponding amine in the form of microscopic globules. This is the case, for example, with the acetate of Rosin Amine D, a mixture of rosin hydrocarbon primary monoamines containing as its principal ingredient dehydroabiethylamine with smaller amounts of abietylamine, di- and tetra-hydroabietylamine, and dextro-pimarylamine. The amine mixture is itself insoluble in water, and its hydrochloride is soluble only to a maximum concentration of about 0.06% while its nitrate, sulfate and phosphate are even less soluble. Its acetate and formate are soluble at higher concentrations, but upon dilution with water to a range of about 0.5 to 2.0%, precipitation occurs which fails to clear upon continued dilution with water.

The aforesaid amines and difficulty water-insoluble amine salts have metal corrosion-inhibiting and germicidal properties in aqueous compositions which render them desirable for incorporation in waters employed for secondary oil recovery in the treatment of oil wells, and in water treatment for sanitation purposes. For these applications, however, the added compositions should be water-soluble and stable to separation from resulting aqueous solutions, since otherwise, separated material deposits in pipe lines, handling equipment and underground installations. Anionic emulsifying or dispersing agents are generally unsatisfactory for solubilizing the aforesaid amines or their salts, since they produce gels, or at best cloudy dispersions, the latter generally being formed only when a large excess of the dispersing agent is used. Non-ionic emulsifying and dispersing agents produce some improvement in dispersions of the amines and their salts, but are not effective to produce clear aqueous solutions which can be indefinitely diluted without separation of the amine or amine salt.

An object of this invention is to provide compositions containing water-insoluble amines or difficulty water-soluble amine salts of the type described above, which yield clear aqueous solutions at a concentration of the order of 50%, and in all stages of further aqueous dilution.

Another object is to provide compositions of the aforesaid type which are not sensitive to precipitation on dilution with hard water.

In accordance with my invention, hydrocarbon monoamines in which the hydrocarbon radical includes a non-aromatic group (i. e., an aliphatic or cycloaliphatic group) of at least 10 and preferably 10 to 20 carbon atoms, or a salt of such an amine, is mixed with a water-soluble surface-active quaternary ammonium salt corresponding to the general formula:

wherein R is an organic radical including a hydrocarbon group containing 8 to 20 aliphatic carbon atoms, X is a salt-forming anion, and N≡A represents a member of the group consisting of tertiary amine- and tertiary N-heterocyclic base radicals containing at most 12 carbon atoms, the proportion by weight of said quaternary amine salt to said amine or amine salt being not less than 1:1 and preferably not more than 6:1 in the composition. Compositions within the aforesaid range form clear aqueous solutions at a concentration of the order of 50% by weight, which can be diluted indefinitely with water without clouding or becoming hazy from separation of the amine or the amine salt.

When the aforesaid compositions are diluted with water of relatively low hardness, no precipitation occurs. However, when extremely hard water, e. g. having an equivalent of 300 or more parts per million of calcium carbonate, haziness sometimes appears. In accordance with this invention, I have found that such precipitation can be prevented entirely by further including in the composition a water-soluble surface-active polyglycol ether in which the polyglycol radical serves as the solubilizing group, especially a non-ionic polyglycol ether dispersing agent. Suitable agents for this purpose are, for example, polyglycol ethers produced by condensing multiple molecular proportions of ethylene oxide with an alkyl phenol, a higher fatty alcohol, a higher fatty acid, or alkyl- or arylamines, containing a hydrocarbon radical including aliphatic hydrocarbon groups having a total of at least 8 to 20 carbon atoms, the amount of said polyglycol ether dispersing agent ranging up to about twice the amount of the water-insoluble amine or corresponding salt, depending upon the degree of hardness of the water with which the composition is to be diluted.

Amines which can be solubilized in compositions in accordance with this invention include, for example, dodecylamine, tetradecylamine, cetylamine, cetyl mono- and dimethylamine, octadecylamine, oleylamine, oleyl methylamine, mixtures of primary monoamines corresponding to the alcohols derived by hydrogenation of the fatty acids of natural fats, rosin hydrocarbon amines such as abiethylamine, di- and tetrahydroabietylamine, dehydroabiethylamine and mixtures of such amines corresponding to the alcohols derived by conversion of the carboxyl group of rosin and hydrogenated and/or dehydrogenated rosin to a methylol group, as found, for example, in Rosin Amine D. In addition, water-insoluble or difficultly soluble organic or inorganic salts of these amines such as the sulfates, phosphates, nitrates, hydrochlorides and lower carboxy acid salts such as formates, acetates, propionates, glycollates, oxalates, and lactates can be solubilized in the compositions of this invention.

Quaternary ammonium salts suitable for incorporation in the compositions of the invention include water-soluble higher alkyl benzyl dimethyl ammonium salts, higher alkyl trimethyl ammonium salts, and higher alkyl triethanolammonium salts, e. g. the chlorides, acetates, formates or sulfates, in which the higher alkyl group contains 8 to 20 carbon atoms, especially those in which the alkyl group corresponds to the fatty alcohols obtained by hydrogenation of the natural fat fatty acids. Similarly, alkyl phenoxyethoxy ethyl dimethyl benzyl ammonium salts can be used in which the nuclear alkyl groups of phenoxy radical include at least 8 carbon atoms. Other suitable compounds are N-dodecyl pyridinium chloride or bromide, N-hexadecyl benzimidazolium chloride, and N-dodecyl quinolinium bromide.

As polyglycol ether dispersing agents, there can be used alkoxy- or alkylphenoxy polyethenoxy ethanols, alkyl- or alkyl-arylamino polyethenoxy ethanols, higher aliphatic carboacyl polyethenoxy ethanols and the like in which the initial radical is a hydrocarbon group including 8 to 20 aliphatic carbon atoms, and the polyethenoxy ethanol radical contains at least 4 and preferably 4 to 20 ethenoxy groups.

Compositions of this invention can be conveniently prepared merely by mixing the amine or amine salt with an approximately 50% aqueous solution of the quaternary ammonium salt in such amounts as to yield proportions of the active ingredients within the ranges set out above, and adding a polyglycol ether dispersing agent (if its presence is desired) to the resulting mixture.

My invention will be more fully understood from the following examples, wherein parts and percentages are by weight.

*Example 1*

A composition was prepared by adding 10 parts of Rosin Amine D to a solution of 25 parts of a mixed higher alkyl benzyl dimethyl ammonium chloride (in which the alkyl groups contain 8 to 18 and mainly 12 to 14 carbon atoms, and corresponding to the fatty alcohols obtained by hydrogenation of the natural fat fatty acids) in 65 parts of water. Upon agitating, a clear solution is obtained which can be diluted indefinitely with water without appearance of any precipitate or haziness. However, on dilution with water having a hardness of at least 300 parts per million of calcium carbonate, this composition forms a hazy solution.

*Example 2*

A composition was prepared by mixing 7.8 parts of Rosin Amine D with 34.6 parts of a 53% aqueous solution of the higher alkyl benzyl dimethyl ammonium chloride of Example 1, and adding 10 parts of isooctylphenoxy polyethenoxy ethanol containing about 10 equivalents of ethylene oxide per molecule in the polyethenoxy ethanol chain, together with 47.6 parts of water. A clear solution was obtained which could be diluted indefinitely with soft water as well as with water having a hardness equivalent to 500 parts per million of calcium carbonate, without any trace of haziness or precipitation.

*Example 3*

Several compositions were prepared, each containing 10 parts of Rosin Amine D mixed, respectively, with 20, 40, 60 and 80 parts of a 50% aqueous solution of the quaternary ammonium chloride of the foregoing examples. The first two of these compositions, in which the ratio of the amine to the quaternary ammonium salt was 1:1 or 1:2, were cloudy at room temperature (about 20° C.) and yielded hazy solutions upon dilution with water at the same temperature. The latter two compositions, in which the ratio of the quaternary ammonium salt to the amine was 3:1 or 4:1 were clear solutions at room temperature, and on dilution with water, yielded clear solutions at all resulting concentrations.

*Example 4*

10 parts of decylamine were thoroughly mixed with 70 parts of a 50% aqueous solution of the quaternary ammonium chloride of the foregoing examples, whereby a clear solution was obtained which could be indefinitely diluted with water without appearance of haze or other evidence of separation of any of its components.

*Example 5*

10 parts of dodecylamine were thoroughly mixed with 120 parts of a 50% aqueous solution of the quaternary ammonium salt of the foregoing examples. A clear solution was obtained which could be indefinitely diluted with water without separation or precipitation.

*Example 6*

Three compositions were prepared by mixing, in each case, 14.3 parts of 70% aqueous Rosin Amine D acetate with 20, 40 and 60 parts, respectively, of a 50% aqueous solution of the quaternary ammonium salt of the preceding examples. All of the resulting compositions were clear solutions at room temperature, and upon progressive dilution with soft water at the same temperature, the resulting solutions remained clear at all concentrations. Rosin Amine D acetate, when diluted with water in the absence of the aforesaid dispersing agent, becomes hazy at a concentration between 0.5 and 2%, and further dilution fails to eliminate the haziness. However, when water of extreme hardness (e. g. of at least 300 parts per million of calcium carbonate) is employed for diluting the compositions of this example, some haziness occurs.

*Example 7*

A composition was prepared by mixing 15.6 parts of 70% aqueous Rosin Amine D acetate with 65.6 parts of a 53% aqueous solution of the quaternary alkyl benzyl dimethyl ammonium chloride of the foregoing examples, and adding 18.8 parts of a non-ionic dispersing agent prepared by condensing 1 mol of isooctyl phenol with about 10 mols of ethylene oxide. The resulting composition was a clear solution at room temperature, and on dilution with water of a hardness equivalent to 300 parts per million of calcium carbonate, or with soft water, no precipitation or haziness ocurred.

As will be seen from the results of the foregoing examples, compositions in the form of clear concentrated aqueous solutions which can be diluted indefinitely with water are obtained in the case of the water-insoluble amines defined above by employing an amount or quaternary ammonium salt not substantially less than 2½ times the amount of water-insoluble amine. In the case of the amine salts, the proportion of quaternary ammonium compound to amine salt required to form clear solutions at all degrees of dilution with water may be as low as 1:1. If complete stability to precipitation on dilution with hard water is desired, a polyglycol ether dispersing agent is used of which the amount is advantageously about twice the amount of the amine or amine salt. However, lesser amounts of the polyglycol ether surface-active agent can be used for water of intermediate degrees of hardness.

The compositions of this invention are advantageously employed in the waters used for oil well treatment in primary or secondary oil recovery, wherein they serve as germicides and as corrosion-inhibitors for metal equipment. The compositions can also be used for sanitation purposes in the treatment of sewage disposal plant effluents, in textile finishing compositions and processing, as corrosion-inhibitors in hydrochloric acid solutions, and for fungicides in the preservation of starch, glue and casein against mildew. Another field of use is in the destruction of weeds and other herbaceous growths.

Variations and modifications which will be obvious to those skilled in the art can be made in the procedures hereinbefore described, without departing from the scope or spirit of this invention.

I claim:

1. A composition of matter yielding a clear solution in water at a concentration of 50%, which can be diluted indefinitely with hard water without separation or precipitation of its components, said composition comprising a member of the group consisting of water-insoluble hydrocarbon-monoamines in which the hydrocarbon radical includes a non-aromatic radical of at least 10 carbon atoms, and difficulty water-soluble salts of said amines, together with a water-soluble quaternary ammonium salt having the general formula:

wherein R is a member of the class consisting of alkyl groups having 8 to 20 carbon atoms and alkyl phenoxyethoxyethyl radicals in which the alkyl group contains 8 to 20 carbon atoms, X is a salt-forming anion, and N≡A represents a member of the group consisting of tertiary amine- and tertiary N-heterocyclic base radicals containing, at most, 12 carbon atoms, the proportion of said quaternary ammonium salt to said amine component being at least 1:1.

2. A composition of matter yielding a clear solution in water at a concentration of 50%, which can be diluted indefinitely with hard water without separation or precipitation of its components, said composition comprising a member of the group consisting of water-insoluble hydrocarbon-monoamines in which the hydrocarbon radical includes a non-aromatic radical of at least 10 carbon atoms, and difficulty water-soluble salts of said amines, together with a water-soluble quaternary ammonium salt having the general formula:

wherein R is a member of the class consisting of alkyl groups having 8 to 20 carbon atoms and alkyl phenoxyethoxyethyl radicals in which the alkyl group contains 8 to 20 carbon atoms, X is a salt-forming anion, and N≡A represents a member of the group consisting of tertiary amine- and tertiary N-heterocyclic base radicals containing, at most, 12 carbon atoms, the proportion of said quaternary ammonium salt to said amine component being between 1:1 and 6:1.

3. A composition of matter yielding a clear solution in water at a concentration of 50%, which can be diluted indefinitely with hard water without separation or precipitation of its components, said composition comprising a member of the group consisting of water-insoluble hydrocarbon-monoamines in which the hydrocarbon radical includes a non-aromatic radical of at least 10 carbon atoms, and difficulty water-soluble salts of said amines, together with a water-soluble quaternary ammonium salt having the general formula:

wherein R is a member of the class consisting of alkyl groups having 8 to 20 carbon atoms and alkyl phenoxyethoxyethyl radicals in which the alkyl group contains 8 to 20 carbon atoms, X is a salt-forming anion, and N≡A represents a member of the group consisting of tertiary amine- and tertiary N-heterocyclic base radicals containing, at most, 12 carbon atoms, the proportion of said quaternary ammonium salt to said amine component being at least 1:1, said compositions further including a water-soluble surface-active polyglycol ether dispersing agent of the class consisting of condensation products of multiple molecular proportions of ethylene oxide with higher fatty alcohols, higher fatty acids, alkyl phenols, alkyl- and alkylaryl primary and secondary amines which contain 8 to 20 aliphatic carbon atoms, the amount of said dispersing agent ranging up to twice the amount of said amine component.

4. A composition of matter yielding a clear solution in water at a concentration of 50%, which can be diluted indefinitely with water without separation or precipitation of its components, said composition consisting essentially of a rosin hydrocarbon-primary monoamine and a water-soluble higher alkyl benzyl dimethyl ammonium salt in which the higher alkyl group contains 8 to 20 carbon atoms, the ratio of said quaternary ammonium salt to said amine being not substantially less than 2.5:1.

5. A composition of matter yielding a clear solution in water at a concentration of 50%, which can be diluted indefinitely with hard water without separation or precipitation of its components, said composition consisting essentially of a rosin hydrocarbon-primary monoamine and a water-soluble higher alkyl benzyl dimethyl ammonium salt in which the higher alkyl group contains 8 to 20 carbon atoms, the ratio of said quaternary ammonium salt to said amine being not substantially less than 2.5:1, and an alkyl phenoxy polyethenoxy ethanol in which the alkyl group contains 8 to 20 carbon atoms, the amount of the latter compound ranging up to about twice the amount of said primary monoamine.

6. A composition of matter yielding a clear solution in water at a concentration of 50%, which can be diluted indefinitely with water without separation or precipitation of its components, said composition consisting essentially of a salt of a rosin hydrocarbon-primary monoamine and a water-soluble higher alkyl benzyl dimethyl ammonium salt in which the higher alkyl group contains 8 to 20 carbon atoms, the ratio of said quaternary ammonium salt to said amine being not subtantially less than 1:1.

7. A composition of matter yielding a clear solution in water at a concentration of 50%, which can be diluted indefinitely with hard water without separation or precipitation of its components, said composition consisting essentially of a salt of a rosin hydrocarbon-primary monoamine and a water-soluble higher alkyl benzyl dimethyl ammonium salt in which the higher alkyl group contains 8 to 20 carbon atoms, the ratio of said quaternary ammonium salt to said amine being not substantially less than 1:1, and an alkyl phenoxy polyethenoxy ethanol in which the alkyl group contains 8 to 20 carbon atoms, the amount of the latter compound ranging up to about twice the amount of said amine salt.

References Cited in the file of this patent

UNITED STATES PATENTS

| | | |
|---|---|---|
| 1,883,042 | Somerville | Oct. 18, 1932 |
| 2,137,465 | Thackston | Nov. 25, 1938 |
| 2,178,831 | Bruson | Nov. 7, 1939 |
| 2,254,940 | Endres | Sept. 2, 1941 |
| 2,356,254 | Lehmann | Aug. 22, 1944 |
| 2,398,295 | Epstein et al. | Apr. 9, 1946 |
| 2,460,259 | Kahler | Jan. 25, 1949 |
| 2,466,517 | Blair | Apr. 5, 1949 |
| 2,468,163 | Blair | Apr. 26, 1949 |
| 2,484,010 | Bried | Oct. 11, 1949 |
| 2,510,063 | Bried | June 6, 1950 |

FOREIGN PATENTS

| | | |
|---|---|---|
| 184,535 | Switzerland | Aug. 17, 1936 |

OTHER REFERENCES

"Power," March 1945, pages 71–74.